Patented Aug. 13, 1929.

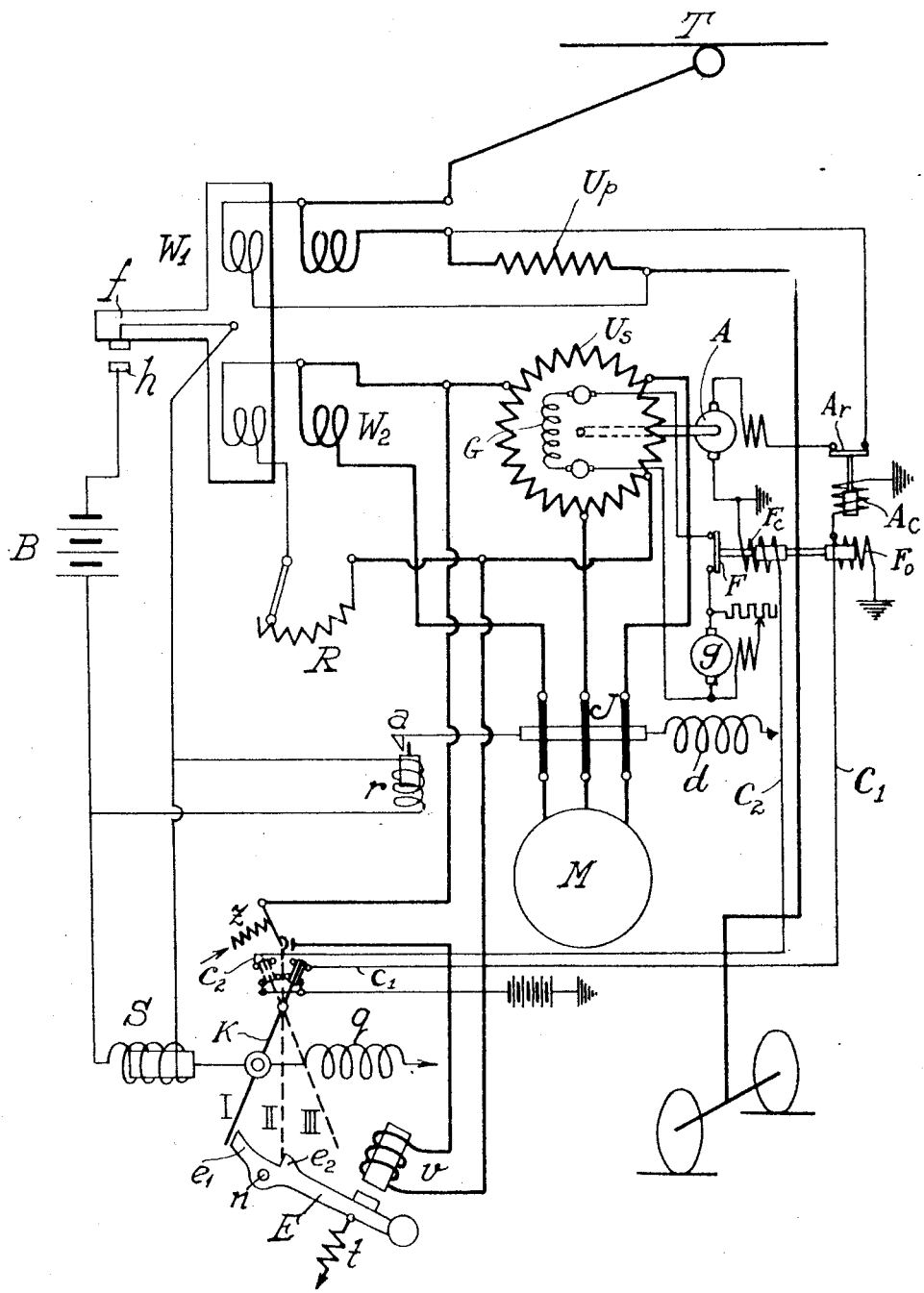

1,724,382

UNITED STATES PATENT OFFICE.

KALMAN von KANDÓ, OF BUDAPEST, HUNGARY, ASSIGNOR TO WESTINGHOUSE ELECTRIC & MANUFACTURING COMPANY, A CORPORATION OF PENNSYLVANIA.

SYNCHRONOUS PHASE CONVERTER.

Application filed April 22, 1925, Serial No. 25,064, and in Hungary June 4, 1924.

In systems in which a number of motors, for instance on railway vehicles are fed from the current net by means of a phase converter the temporary cessation or interruption of the current or sudden overloading of the motor or the phase converter, results in the phase converter falling out of step.

The invention relates to an arrangement for again bringing the phase converter into synchronism if it should fall out of step or for again starting it if it should come completely to rest. This can be accomplished without rush of current if the synchronous phase converter is designed with a particularly high internal self induction to permit the regulation of the secondary voltage independently of the primary voltage. The phase converters possess the peculiarity that after they have fallen out of step, the speed of rotation diminishes very slowly if they are unloaded, so that even after several minutes the phase converter may still have a sufficiently high speed to enable it to be again brought into phase without special starting devices if it is merely again connected to the supply.

According to the invention the secondary circuit of the phase converter is provided with an automatic circuit breaker subjected on the one hand to the action of a wattmeter measuring the primary load of the phase converter and on the other hand to the opposite action of a wattmeter measuring the secondary load of the phase converter in such a manner that if the action of the wattmeter measuring the secondary load preponderates, the circuit breaker is opened. As a result of this arrangement the control of the circuit breaker operates always in the same sense, whether the motor is taking current or during the regeneration when the motor feeds current back to the line and also during the transition between these two kinds of operation.

The drawing shows diagrammatically one embodiment of the invention. T is the feed wire from which the primary winding U$p$ of the phase converter is fed, the secondary winding U$s$ supplying the induction motor M. As illustrated, the converter is provided with a rotary exciting winding G fed by a direct current generator $g$.

In the secondary circuit of the phase converter is arranged a circuit-breaker J which is held in the closed position by a projection $a$ against the pull of the spring $d$. The projection $a$ can be released by the energization of the release magnet $r$, which is connected in circuit with a source of current B, the circuit of the source of current being controlled by the contact lever $f$ by means of the contact $h$. The contact $f$ is subjected to the action of two wattmeters W1 and W2 of which the first is in the circuit of the primary winding U$p$ of the phase converter while the second is in the secondary circuit U$s$ of the phase converter. The two wattmeters W1 and W2 are so arranged that they operate on the control lever $f$ in opposite directions.

During normal motoring operation of the motor M, the secondary output wattmeter W2 exerts a positive torque tending to close the control lever $f$, and the primary input wattmeter W1 exerts a negative torque tending to open it or keep it open, but the primary input is greater than the secondary output, and the negative, or opening, torque of the primary wattmeter prevails, and the control lever $f$ stays open.

When the motor M is at standstill, or coasting, the secondary output is zero, and the negative torque of the primary input wattmeter W1 still prevails to keep the control lever $f$ open.

During regenerative operation of the motor M, the torque of the secondary wattmeter W2 reverses and tends to open the control lever $f$, whereas the torque of the primary wattmeter W1 also reverses and thus tends to close the control lever $f$, but not with as much force as the opening force of the secondary wattmeter, because of the losses in the converter during regeneration. The predominating, or resultant, force on the control lever $f$ is, therefore, still in the negative, or opening, direction.

If, however, for any reason the current supply is interrupted or the phase converter falls out of step, the current taken by the converter likewise become zero, and in either case the wattmeter W1 becomes inoperative, so that the wattmeter W2 which is now alone and therefore preponderates moves the control lever $f$ in such a direction that the contact $h$ is closed and the release magnet $r$ is energized, so that the circuit breaker J is opened, and the motor disconnected. If the disconnection of the motor M takes place sufficiently quickly after the interruption of the primary circuit or after the phase converter has fallen out of step, the phase converter will still be rotating sufficiently fast so that it can by itself increase its speed when current is again supplied to it and pull into step again. The motor can now be again connected up.

In order, however, to bring the phase converter to synchronism again automatically, if the interruption of the primary current supply lasts so long that the speed of the phase converter even though it is unloaded, is no longer sufficient to enable it by itself to attain synchronism, a starting switch is employed which comes into action at the same time as the automatic circuit breaker in the secondary circuit of the phase converter is operated.

According to the drawing, this starting switch consists of a switch K which may be operated in one direction by a spring $q$ and in the other direction by an operating device controlled by the automatic disconnecting device for the secondary of the phase converter. This operating device consists according to the drawing, for instance, of an electromagnet S connected in the circuit of the source of current B. The starting switch K is, moreover provided with a two-step checking device E which is controlled by an electromagnet $v$ influenced by the secondary voltage of the phase converter and operating against the spring $t$, in the energizing circuit of which is the contact $z$ for opening the circuit in the middle position II of the starting switch K. This two-step checking device consists in the example shown, of a pawl E pivoted about the pin $n$ and provided with two teeth $e1$ and $e2$, and held in the position shown by means of the spring $t$. This spring $t$ operates in opposition to the electromagnet $v$ fed with the secondary voltage of the phase converter, this magnet being only energized when the converter is very close to synchronism. On the release of the circuit breaker J and the cutting out of the motor, the operating magnet S of the starting switch K is energized at the same time as the release magnet $r$ and moves the starting switch K into the position I in which it is held by the tooth $e1$ of the pawl E. The primary circuit of the phase converter is without current and therefore the electromagnet $v$ is inoperative as well as the wattmeter W1. In the position I, the starting switch K opens the exciting circuit of the phase converter by means of a control circuit C1 and an opening coil Fo of a field-circuit switch F. The control circuit C1 also operates a closing coil Ac of a normally open relay Ar for controlling an auxiliary starting motor A or other starting means of the phase converter, whereupon the phase converter is speeded up to synchronism or is started if it has already come completely to rest.

Immediately before the phase converter attains its synchronous speed, the secondary voltage of the phase converter suddenly rises sharply so that the electromagnet $v$ is energized and attracts the pawl E against the tension of the spring $t$, and in consequence the tooth $e1$ releases the starting switch K. Since as a consequence of the increase of primary watts taken by the phase converter the wattmeter W1 again predominates and opens the contact $h$, the operating magnet S is de-energized and the spring $q$ moves the starting switch K into the position II where it is held by the tooth $e2$ of the pawl E. In this position, the switch K again disconnects the starting device of the phase converter so that the converter again runs as a single-phase induction motor, the starting-motor relay Ar returning to its normal open position, to which it is biased by gravity or otherwise, thereby disconnecting the auxiliary starting motor A, and the field-circuit relay F, being unbiased, remaining in its open position. At the same time the flow of current to the magnet $v$ is interrupted at contact $z$, whereupon the pawl E which in consequence of its inertia moves slowly, can again return to the position shown, in which the tooth $e2$ releases the starting switch K, so that it is pulled by the spring $q$ into the normal position III. In this position of the starting switch, a second control circuit C2 operates to energize a closing coil Fc on the field-magnet relay F, whereby the excitation of the phase converter is again connected up and the motor M can now again be placed in circuit.

By means of this arrangement, it is ensured that as soon as the pressure is again applied to the terminals of the primary winding of the phase converter, the converter automatically speeds up or if it has come to rest is automatically restarted. The phase converter is thus automatically brought into condition for the motor M to be again connected up.

If speed control of the induction motor is effected by a system of pole changing which involves at the same time an alteration of the number of phases it is necessary that simultaneously with the alteration of the number of phases the constants of one or both wattmeters W1 and W2 shall be altered.

Having now particularly described and ascertained the nature of my said invention, and in what manner the same is to be performed, I declare that what I claim is:—

1. A synchronous phase-converter provided with circuit interrupting means for its secondary circuit, and actuating means for said interrupting means comprising means responsive to a difference in the secondary and primary loads of said converter, said last named means being effective to place said interrupting means in open position when the secondary load is greater than the primary load.

2. A synchronous phase-converter provided with circuit interrupting means for its secondary circuit, actuating means for said interrupting means comprising watt-meters measuring the primary and secondary loads of said converter, said watt-meters respectively actuating said circuit interrupting means in opposite directions in such manner that said circuit interrupting means will be placed in open position when the secondary load is greater than the primary load.

3. The combination with a synchronous phase-converter of means for interrupting its secondary circuit, actuating means for said interrupting means comprising watt-meters measuring the primary and secondary loads of said converter, said watt-meters respectively actuating said circuit interrupting means in opposite directions in such manner that said circuit interrupting means will be placed in open position when its secondary load is greater than its primary load, a starting switch for said converter, and means for automatically actuating said starting switch upon interruption of said secondary circuit.

4. A synchronous phase-converter provided with circuit interrupting means for its secondary circuit, actuating means for said interrupting means comprising watt-meters measuring the primary and secondary loads of said converter, said watt-meters respectively actuating said circuit interrupting means in opposite directions in such manner that said circuit interrupting means will be placed in open position when the secondary load is greater than the primary load, and means automatically operable upon the operation of the aforesaid actuating means for bringing said phase-converter again into synchronism upon the restoration of normal line conditions.

5. A synchronous phase-converter provided with an exciting circuit and circuit interrupting means for the converter secondary circuit, actuating means for said interrupting means comprising wattmeters measuring the primary and secondary loads of said converter, said watt-meters respectively actuating said circuit interrupting means in opposite directions in such manner that said circuit interrupting means will be placed in open position when the load of said secondary circuit exceeds the load of the primary circuit, means for speeding up the converter to synchronous speed when said secondary circuit is interrupted comprising a starting device for the converter operated automatically when said secondary circuit is interrupted, and means for rendering said starting device inoperative and closing said exciting circuit when said converter has attained synchronous speed.

6. An electrical converting device comprising a primary circuit and a secondary circuit and means for disconnecting the secondary circuit when the primary input power becomes zero, said means comprising a switching lever and means responsive to the secondary power tending to close said switching lever during normal power flow away from the converting device and tending to open the switching lever during operation when power is flowing from the secondary circuit into the converting device, and means responsive to the primary power and developing a torque in a direction opposite to that of the secondary-power-responsive means.

7. A rotating electrical converting device comprising a primary circuit and a secondary circuit and control means operative when the primary input power becomes zero, said control means comprising a switching lever and means responsive to the secondary power tending to close said switching lever during normal power flow away from the converting device and tending to open the switching lever during operation when power is flowing from the secondary circuit into the converting device, and means responsive to the primary power and developing a torque in a direction opposite to that of the secondary-power-responsive means.

8. A synchronous electrical converting device comprising a primary circuit and a secondary circuit and control means operative when the primary input power becomes zero, said control means comprising a switching lever and means responsive to the secondary power tending to close said switching lever during normal power flow away from the converting device and tending to open the switching lever during operation when power is flowing from the secondary circuit into the converting device, and means responsive to the primary power and developing a torque in a direction opposite to that of the secondary-power-responsive means; means responsive to the closure of said switching lever to disconnect said secondary circuit, and means also responsive to the closure of said switching lever for again bringing said converting device into synchronism.

9. A synchronous electrical converting device having a direct-current exciting circuit and comprising a primary circuit and a secondary circuit and control means operative when the primary input power becomes zero, said control means comprising a switching lever and means responsive to the secondary power tending to close said switching lever during normal power flow away from the converting device and tending to open the switching lever during operation when power is flowing from the secondary circuit into the converting device, and means responsive to the primary power and developing a torque in a direction opposite to that of the secondary-power-responsive means; means responsive to the closure of said switching lever to disconnect said secondary circuit, and restarting means comprising a biased three-position starting switch normally in position III, means responsive to the closure of the aforesaid switching lever to move said starting switch to position I, a biased pawl normally in such position that it is capable of latching said starting switch in position I, a solenoid responsive to the secondary voltage of said converting device for actuating said pawl to release said switch from position I when the converting device begins to approach synchronous speed, after an interruption of the primary circuit, said pawl having an auxiliary detent operative to catch and hold the switch in position II as long as the pawl is in its actuated position; means operative when said switch is in position I to start said converting device and deenergize the exciting circuit therefor, means operative when said switch is in position II for deenergizing the pawl-actuating solenoid, and means operative when said switch is in position III to energize said exciting circuit.

10. The combination with a synchronous machine having a direct-current exciting winding, of a starting mechanism comprising a biased three-position starting switch normally in position III, a control circuit including means capable of moving said starting switch to position I, a biased pawl normally in such position that it is capable of latching said starting switch in position I, means for deriving a voltage, from said machine, which increases as the speed increases toward synchronism, means for applying said voltage in such manner as to actuate said pawl to release said switch from position I, said pawl having an auxiliary detent operative to catch and hold the switch in position II as long as the pawl is in its actuated position; means operative when said switch is in position I to start said machine and deenergize the exciting circuit therefor, means operative when said switch is in position II for deenergizing the pawl-actuating means, and means operative when said switch is in position III to energize said exciting circuit.

In testimony whereof I affix my signature.

Dr. KALMAN von KANDÓ.